United States Patent [19]

Maruta et al.

[11] Patent Number: 5,478,918
[45] Date of Patent: Dec. 26, 1995

[54] LOW STRESS POLYIMIDE COMPOSITION AND PRECURSOR COMPOSITION SOLUTION OF SAME

[75] Inventors: Masamichi Maruta; Hidehisa Nanai; Yoshihiro Moroi; Hiroshi Takahashi; Seiji Hasegawa, all of Kawagoe, Japan

[73] Assignee: Central Glass Company, Limited, Yamaguchi, Japan

[21] Appl. No.: 189,774

[22] Filed: Feb. 1, 1994

[30] Foreign Application Priority Data

Feb. 9, 1993 [JP] Japan ................. 5-0520970

[51] Int. Cl.$^6$ .................................................. C08G 73/10
[52] U.S. Cl. .......................... 528/353; 528/26; 528/125; 528/128; 528/170; 528/171; 528/172; 528/173; 528/174; 528/176; 528/220; 528/229; 528/310; 528/322; 528/351; 525/432; 525/435; 525/436; 525/477; 524/600; 524/606
[58] Field of Search ..................... 524/600, 606; 528/171, 26, 174, 125, 128, 170, 172, 173, 176, 220, 229, 350, 351, 353, 310, 322; 525/432, 435, 436, 477

[56] References Cited

U.S. PATENT DOCUMENTS

| | | | |
|---|---|---|---|
| 5,071,997 | 12/1991 | Harris | 528/128 |
| 5,104,946 | 4/1992 | Lee | 528/26 |
| 5,218,083 | 6/1993 | Gerber et al. | 528/353 |

FOREIGN PATENT DOCUMENTS

| | | |
|---|---|---|
| 60-250031 | 12/1985 | Japan . |
| 61-60725 | 3/1986 | Japan . |
| 62-184025 | 8/1987 | Japan . |
| 62-235382 | 10/1987 | Japan . |
| 62-253621 | 11/1987 | Japan . |
| 2-014365 | 4/1990 | Japan . |
| 3-205474 | 9/1991 | Japan . |
| 3-247680 | 11/1991 | Japan . |
| 4-198363 | 7/1992 | Japan . |

*Primary Examiner*—P. Hampton-Hightower
*Attorney, Agent, or Firm*—Keck, Mahin & Cate

[57] ABSTRACT

A polyimide precursor composition solution includes a tetracarboxylic acid component containing not less than 70 mol % of at least one selected from the group consisting of benzenetetracarboxylic acid and its reactive derivatives; a maleimide compound; and a diamine component containing not less than 70 mol % of 2,2'-substituted-4,4'-benzidine represented by the general formula (I) and siloxydiamine amounting to from 1 to 10 mol %. The tetracarboxylic acid component, the maleimide compound and the diamine component are dissolved in a solvent which is consisting essentially of γ-butyrolactone. The amount of the tetracarboxylic acid component is substantially equivalent to that of the diamine component. The amount of the maleimide compound is from 5 to 30 wt % of the total weight of the tetracarboxylic acid and the diamine component. A polyimide coating film prepared from the polyamide precursor solution is very low in residual stress and superior in adhesion to a substrate, has a very flat surface and can be desirably treated by wet etching process with an etching solution which is not hazardous.

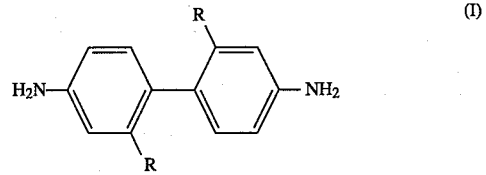

(I)

wherein R are the same or different ones selected from the group consisting of $CF_3$, $CH_3$, $C_2H_5$, $OCH_3$, $OC_2H_5$, Cl, Br and phenyl group.

8 Claims, No Drawings

LOW STRESS POLYIMIDE COMPOSITION AND PRECURSOR COMPOSITION SOLUTION OF SAME

BACKGROUND OF THE INVENTION

The present invention relates to a low stress polyimide composition using as a coating material to a substrate having thermal expansion coefficient less than 30 ppm/°C. and a precursor composition solution of the polyimide composition.

As a heat resistant material, polyimides are widely used for coating various substrates therewith. Various improvements have been proposed to enhance adhesion of polyimides to substrates without sacrificing heat resistance and other useful properties. However, a conventional polyimide film obtained by heat treatment has a high residual stress due to a large difference of thermal expansion coefficient between a substrate and the polyimide. With this, the film will tend to have deformation, peeling and breaking. To solve this problem, for example, JP-A-60-250031, JP-A-61-60725 and JP-A-62-184025 propose polyimides which have small positive values of thermal expansion coefficient due to hard main chain structures of the polyimide molecules. Polymer Preprints, Japan vol. 39, No. 3, 790 (1990) discloses a fluorine-containing polyimide prepared by reacting pyromellitic acid dianhydride with 2,2'-bis(trifluoromethyl)-4,4'-benzidine. This polyimide has a hard main chain structure and a negative thermal expansion coefficient. However, thermal expansion coefficient of this polyimide can be controlled within a range from $-5\times10^{-6}$ to $8.2\times10^{-5}$ by copolymerizing other components or by blending other polymers.

The above-mentioned polyimides having hard main chain structures are unsatisfactory in adhesion to a substrate such as a glass, a ceramic or an organic material. Therefore, it is recommended to rough a substrate surface by, for example, plasma treatment. Furthermore, the above-mentioned polyimides having hard main chain structures are hard to be treated by wet etching process. JP-A-62-253621 discloses a polyimide which has a low thermal expansion coefficient and is treated by wet etching process. However, an etching solution for this polyimide is limited to only a solution containing hydrazine and ethylenediamine which is not preferable to be used from a view point of working environment. Furthermore, this polyimide is still unsatisfactory in adhesion.

JP-A-62-235382 discloses a thermosetting adhesive film prepared by compounding a polyimide and a polymaleimide. JP-A-3-247680 discloses a heat resistant adhesive film prepared by adding a bismaleimide compound to a polyamic acid solution. JP-A-4-198363 discloses a solvent resistant polyimide composition prepared by blending a polyimide having fluorine-containing substituent groups with a bismaleimide compound. JP-A-3-205474 discloses an adhesive composition prepared by adding a bismaleimide compound to a polyamic acid solution of which glass transition point after the completion of imidization reaction is not higher than 260° C. The above prior art relate to a polyimide or a polyamic acid, which has a flexible connecting group such as —O— in its main chain and is large in thermal expansion coefficient. A polyimide which has a hard main chain and is small in thermal expansion is insoluble in any solvent, and has a high glass transition point which is usually not lower than 260° C. Therefore, it is considered to be difficult to improve adhesive property by blending a bismaleimide compound through a conventional technique. Furthermore, it is not easy to treat a three-dimensionally cured bismaleimide by wet etching process. The above mixture containing a bismaleimide compound is mainly used as an independent type film, and it is not mentioned at all if the mixture can be treated by wet etching process or not.

SUMMARY OF THE INVENTION

It is therefore an object of the present invention to provide a polyimide coating film coated on a substrate, which is very low in residual stress and superior in adhesion to the substrate, has a very flat surface and can be desirably treated by wet etching process with an etching solution which is not hazardous, and a polyimide precursor composition solution for such polyimide coating film.

According to a first aspect of the present invention, there is provided a polyimide precursor composition solution comprising:

a tetracarboxylic acid component containing not less than 70 mol % of at least one selected from the group consisting of benzenetetracarboxylic acid and its reactive derivatives;

a maleimide compound; and a diamine component containing not less than 70 mol % of 2,2'-substituted-4,4'-benzidine represented by the general formula (I) and siloxydiamine amounting to from 1 to 10 mol %,

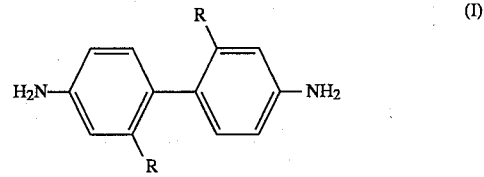

wherein R are the same or different ones selected from the group consisting of $CF_3$, $CH_3$, $C_2H_5$, $OCH_3$, $C_2H_5$, Cl, Br and phenyl group, wherein said tetracarboxylic acid component, said maleimide compound and said diamine component are dissolved in a solvent which is consisting essentially of γ-butyrolactone, wherein the amount of said tetracarboxylic acid component is substantially equivalent to that of said diamine component, and wherein the amount of said maleimide compound is from 5 to 30 wt % of the total weight of said tetracarboxylic acid and said diamine component.

According to a second aspect of the present invention, there is provided a low stress polyimide composition which is prepared by applying the polyimide precursor composition solution to a substrate, then by heating the applied solution at a certain temperature to remove a solvent and to form a precursor film, and then by heating the precursor film at a temperature not lower than 200° C. to cure the same.

A polyimide according to the present invention has a low thermal expansion coefficient ranging from 0 to 30 ppm/°C. and a residual stress ranging from −3 to 3 MPa relative to various substrates having thermal expansion coefficients less than 30 ppm/°C., is superior in adhesion, and can be desirably treated by wet etching process and stably stored.

DESCRIPTION OF THE PREFERRED EMBODIMENTS

A polyimide precursor composition solution according to the present invention is prepared by dissolving a tetracarboxylic acid component, a diamine component and a maleimide compound in a solvent.

The tetracarboxylic acid component contains not less than 70 mol % of at least one selected from the group consisting of benzenetetracarboxylic acid and its reactive derivatives such as its anhydride and its esters. The tetracarboxylic acid component may contain less than 30 mol % of other compounds such as some reactive derivatives, for example, anhydrides or esters of trifluoromethylbenzenetetracarboxylic acid, bistrifluoromethylbenzenetetracarboxylic acid, difluorobenzenetetracarboxylic acid, hexafluoroisopropylidenediphthalic acid, biphenyltetracarboxylic acid, benzophenonetetracarboxylic acid, oxydiphthalic acid, cyclobutanetetracarboxylic acid and bicyclo(2,2,2)octo-7-ene-2,3,5,6-tetracarboxylic.

A reaction product of the above-mentioned tetracarboxylic acid anhydride with less than 0.5 equivalent of water, an alcohol or a diamine can be used as the tetracarboxylic acid component, too. The reaction product with water or an alcohol is particularly useful for adjusting the degree of polymerization and viscosity in a high concentration polyamic acid solution. Although there are other measures such as cooking treatment, it is preferable and easy to use water or an alcohol as is described above. Examples of the alcohol for adjusting the degree of polymerization and viscosity are methanol, ethanol, propanol, methyl cellosolve, ethyl cellosolve and diethylene glycol monomethyl ether. The diamine reaction product which is a reaction product of the tetracarboxylic acid with less than 0.5 equivalent of an diamine, and a reaction product of the diamine reaction product with water or an alcohol are useful for dissolving the tetracarboxylic acid component in a solution with a high concentration and a low viscosity. It is not preferable to use a reaction product with not less than 0.5 equivalent of an diamine because the solution is hard to be handled due to viscosity increase.

The diamine component contains not less than 70 mol % of 2,2'-substituted-4,4'-benzidine which is represented by the general formula (I), 4,4'-diaminobenzanilide, 4,4'-binaphtylamine and the like:

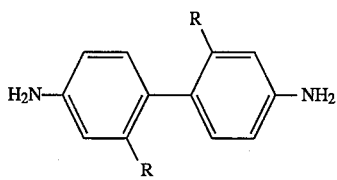

(I)

wherein R are the same or different ones selected from the group consisting of $CF_3$, $CH_3$, $C_2H_5$, $OCH_3$, $C_2H_5$, Cl, Br and phenyl group. Examples of 2,2'-substituted-4,4'-benzidine are 2,2'-bis(trifluoromethyl)-4,4'-benzidine, 2,2'-dimethyl-4,4'-benzidine, 2,2'-diethyl-4,4'-benzidine, 2,2'-dichloro-4,4'-benzidine, 2,2'-dibromo-4,4'-benzidine, 2,2'-dimethoxy-4,4'-benzidine, 2,2'-diethoxy-4,4'-benzidine and 2,2'-diphenyl-4,4'-benzidine.

The diamine component contains siloxydiamine amounting to from 1 to 10 mol %. In the invention, the siloxydiamine is not limited to a particular one. Examples of the siloxydiamine are 1,2-bis(3-aminopropyl)- 1,1,2,2-tetramethyldisiloxane, 1,2-bis(3-aminobutyl)- 1,1,2,2-tetramethyldisiloxane, bis(4-aminophenoxy) dimethylsilane and 1,3-bis(4-aminophenoxy)tetramethyldisiloxane.

The diamine component may contain less than 29 mol % of other diamines such as o-, m-, p-phenylenediamine, 2,4-diaminotoluene, 2,5-diaminotoluene, 2,4-diaminoxylene, 2,4-diaminodurene, 4,4'-diaminodiphenylmethane, 4,4'-diaminodiphenyl ether, 4,4'-diaminodiphenylsulfone, 3,3'-diaminodiphenylsulfone, 4,4'-diaminobenzophenone, 3,3'-diaminobenzophenone, 1,3-bis(3-aminophenoxy)benzene, 1,3-bis(4-aminophenoxy)benzene, 1,4-bis(4-aminophenoxy) benzene, 1,4-bis (4-aminophenoxy)biphenyl, bis [4-(3-aminophenoxy)phenyl]sulfone, bis [4- (4-aminophenoxy) phenyl]sulfone, 2,2-bis[4-(4-aminophenoxy)phenyl]propane, 2,2-bis[4-(4-aminophenoxy)phenyl] hexafluoropropane, 2,2-bis[4-(3-aminophenoxy)phenyl] propane, 2,2-bis[4-(3aminophenoxy)phenyl] hexafluoropropane, 2,2-bis[4-(amino-2-trifluoromethylphenoxy)phenyl]hexafluoropropane, 2,2-bis [4-(3-amino-5-trifluoromethylphenoxy)phenyl] hexafluoropropane, 2,2-bis(4-aminophenyl)hexafluoropropane, 2,2-bis(3-aminophenyl)hexafluoropropane, 2,2-bis(3-amino-4-hydroxyphenyl)hexafluoropropane, 2,2-bis(3-amino-4-methylphenyl)hexafluoropropane, 4,4'-bis(4-aminophenoxy) octofluorobiphenyl, 3,5-diaminobenzotrifluoride, 2,5-diaminobenzotrifluoride, 2,2'-bistrifluoromethyl-4,6'-benzidine, 3,3'-bistrifluoromethyl-4, 4'-benzidine, 3,3'-bistrifluoromethyl-5,5'-benzidine, 3,3'-dimethyl-4,4'-benzidine, 3,3'-diethyl-4,4'-benzidine, 3,3'-dimethoxy-4,4'-benzidine, 3,3'-diethoxy-4,4'-benzidine, 3,3'-dichloro-4,4'-benzidine and 3,3'-dibromo-4,4'-benzidine. It is not preferable to use not less than 30 mol % of these diamines because residual stress of the polyimide coating film will increase.

As the maleimide compound, it is preferable to use a bismaleimide such as 4,4'-bismaleimidediphenylmethane, 4,4'-bismaleimidediphenyl ether, 4,4'-bismaleimidebenzanilide, 2,2'-bis[4-(4-maleimidephenoxy)phenyl]propane or a fluorine-containing bismaleimide such as 2,2'-bis(4-maleimidephenyl)hexafluoropropane, 2,2'-bis[4-(4-maleimidephenoxy)phenyl]hexafluoropropane, 2,2'-bis[4-(2-trifluoromethyl-4-maleimidephenoxy)phenyl]hexafluoropropane or 4,4'-bis(4-maleimidephenoxy)octafluorobiphenyl. These fluorine-containing bismaleimides have high solubilities to some solvents, thereby serving to provide a polyimide precursor composition solution which can be easily applied to a substrate by the conventional methods, for example, by spin coating.

In the invention, the maleimide compound can be used in the form of a maleimide oligomer. Bismaleimide oligomers are obtained by mixing maleimide compound with many kinds of reactive monomers, and among them, preferable examples are combinations of bismaleimidediamine, bismaleimide-biscyanate and bismaleimidebiscyanamide. More preferable examples of the maleimide oligomer are fluorine-containing maleimide oligomers of the above-mentioned fluorine-containing bismaleimide with at least one selected from the group consisting of the above-mentioned fluorine-containing diamines, these fluorine-containing biscyanamide derivatives and fluorine-containing biscyanate derivatives.

The amount of the maleimide compound or the maleimide oligomer is preferably from 5 to 30 wt % of the total weight of the tetracarboxylic acid component and the diamine component. It is more preferable from 10 to 20 wt %. If it is less than 5 wt %, the polyimide coating film becomes inferior in adhesion and can not be desirably treated by wet etching process. If it is more than 30 wt %, the polyimide coating film becomes inferior in mechanical properties and can not be desirably treated by wet etching process. Furthermore, if it is less than 5 wt % or more than 30 wt %, variation of residual stress of the polyimide coating film undesirably increases.

The solvent of the polyimide precursor composition solution is consisting essentially of γ-butyrolactone. However, the solvent may contain less than 50 wt % of a common solvent of a polyamic acid so as not to substantially change the dissolving power of γ-butyrolactone. Examples of the common solvent of a polyamic acid are amide solvents such as N-methylpyrrolidone, N,N-dimethylformamide or N,N-dimethylacetoamide, a chain or cyclic urea solvent, a chain or cyclic alcohol solvent, a chain or cyclic ester solvent, a chain or cyclic sulfoxide solvent and a chain or cyclic sulfone solvent. In the invention, other solvents may be mixed with the polyimide precursor composition solution to prepare the prepolymer and to adjust viscosity.

In the invention, it is not preferable to gradually add the tetracarboxylic acid component, the diamine component and the maleimide compound in small portions into the polar solvent because it takes a long time to dissolve the maleimide compound in a viscous polyamic acid solution. In the invention, a preferable process to prepare the polyimide precursor composition solution involves adding the total amount of the tetracarboxylic acid component, the total amount of the diamine component and the total amount of the maleimide compound into a container, then adding the total amount of the solvent into the container so as to complete the reaction as soon as possible, and then allowing the solution to age. In this process, the order of addition of the tetracarboxylic acid component, the diamine component and the maleimide compound is not particularly important. It is preferable to conduct the reaction and the aging at about room temperature ranging from 10° to 100° C. It is not necessary to conduct the reaction and the aging at a temperature not higher than 10° C. It is not preferable to conduct the reaction and the aging at a temperature not lower than 100° C. because partial imidization occurs. The time for the reaction and the aging is not shorter than 30 min. Sometimes the aging lasts for several tens of days. However, in this case, it suffices to let the solution stand in the container. The aging is continued until the change of viscosity of the solution over time substantially terminates.

Another process to prepare the polyimide precursor composition solution involves adding the tetracarboxylic acid component into one portion of the solvent and the diamine component into the other portion of the solvent, then adding the maleimide compound into at least one of the tetracarboxylic acid component solution and the diamine component solution, and then mixing the tetracarboxylic acid component solution with the diamine component solution in such a manner that the amount of the tetracarboxylic acid component is substantially equivalent to that of the diamine component. The mixture of the diamine and the maleimide compound is stable in γ-butyrolactone. However, the nucleophilic siloxydiamine tends to precipitate as a slightly soluble solid or a gel through Michael addition reaction with the maleimide compound. Therefore, it is preferable to mix the maleimide compound with the tetracarboxylic acid, or with the diamine component which does not contain the siloxydiamine. In the latter case, the siloxydiamine is used as a part of the diamine component which is used for preparing the oligomerized tetracarboxylic acid. The oligomerized tetracarboxylic acid component can be prepared by dissolving the diamine having a high solubility and then by adding an excess amount of the tetracarboxylic acid anhydride. To add the maleimide compound to the oligomerized tetracarboxylic acid, the maleimide compound together with the diamine component may be mixed with the tetracarboxylic acid anhydride solution, or the maleimide compound may be mixed with a mixture prepared by adding the tetracarboxylic acid anhydride to the diamine solution. To avoid the gelation derived from Michael addition reaction, it is preferable to mix the maleimide compound with a mixture which has been prepared by adding the tetracarboxylic acid anhydride to the diamine component containing the siloxydiamine. Water or an alcohol may be added to the solvent either before the addition of the tetracarboxylic acid anhydride or after the addition, and then the solution is aged for about 1 hr at a temperature ranging from 50° to 100° C. so as to adjust the degree of polymerization. This step may be conducted under the presence of the maleimide compound.

A novel polyimide compound according to the present invention is produced by applying the polyimide precursor composition solution to a substrate, then removing the solvent, and then heating the coating film. The thus produced polyimide coating film is low in residual stress and improved in adhesion, and can be desirably treated by wet etching process. As compared with an adhesive film disclosed in JP-A-3-205474, which is adhered to a substrate by heat pressing, a coating film according to the present invention is adhered to a substrate only by heating under normal pressure.

To remove the solvent from the polyimide precursor composition, it is heated at a temperature ranging from 50° to 150° C. for 10 to 150 min under the atmosphere of an inactive gas such as air, nitrogen or hydrogen. In more detail, if the polyimide precursor film has a thickness not thicker than 10 μm, it can be heated at a temperature not lower than 100° C. for a time not longer than 30 min. However, if the film has a thickness not thinner than 50 μm, it is preferably to be heated at a temperature not higher than 80° C. for a time not shorter than 60 min so as to make the film flat and to prevent whitening and the occurrence of bubbles. A fluorine-containing maleimide compound according to the present invention has a low melting point and a low softening point and is good in compatibility. Therefore, it is not crystallized in the process of the solvent removal.

The polyimide precursor film is heated so as to convert the same into the polyimide film at a temperature ranging from 200° C. at which curing of the maleimide compound starts to 400° C. for a time from 20 to 150 min under the atmosphere of an inactive gas such as air, nitrogen or hydrogen, and then annealed to lower the temperature to a temperature not higher than 100° C. by spending 10 to 180 min. It is heated more preferably at a temperature not lower than the temperature of maximum exothermic point and still more preferably at a temperature not lower than a temperature at which the curing terminates.

The polyimide film heated at about the temperature of maximum exothermic point has a larger residual stress than the polyimide film heated at about the temperature at which the curing starts or at about the temperature at which the curing terminates. A larger residual stress of the former polyimide film does not decrease even if it is annealed at a high temperature. On the other hand, if the polyimide film is heated at about the temperature of maximum exothermic point for a certain period and then annealed at a high temperature without cooling, it will have a small residual stress.

During the solvent removal process and the heating process, the temperature is raised stepwise with a hot plate or an oven, or continuously with an oven or a conveyer type zone furnace.

The polyimide coating film can be processed by a dry method in which plasma is used under the atmosphere containing oxygen or by a wet method in which, for example, an alkali aqueous solution with a high concentration or hydrazine is used. The polyimide coating film which is obtained by the heating at a temperature not lower than 300° C. and masked with a negative type resist can be etched by a depth at least 10 μm by a hydrazineethylenediamine solution. This polyimide coating film can be etched by a depth at least 30 μm by an etching solution containing 5–20 wt % of quaternary ammonium hydroxide, 10–60 wt % of amino-alcohol and 20–80 wt % of an alcohol.

To treat the polyimide coating film by a wet etching process, at first, the polyimide precursor film is provisionally heated at a temperature ranging from 200° C. to the temperature of maximum exothermic point, then is treated by a wet etching process, and then is heated at a temperature ranging from 300° to 400° C. With this, the polyimide coating film has a good adhesion, and is very finely etched and low in residual stress.

A method of applying the polyimide precursor solution to a substrate is not limited to a specific one. Examples of the applying method are spin coating, dip coating, printing, coating with brush, curtain coating and spraying. Of these, it is preferable to choose spin coating.

The substrate for the application of the polyimide precursor solution is not limited to a specific one. Examples of the substrate having a thermal expansion coefficient less than 30 ppm/°C. are metals such as copper, aluminum, silicon, alloy of these metals and stainless steel, ceramics such as alumina, glass, borosilicate glass, quartz, zirconia and mullite, and semiconductor materials such as barium titanate, lithium niobate, tantalum niobate, gallium arsenide and indium phosphide. The polyimide precursor solution can also be applied to the above-mentioned substrate which is coated with a heat resistant polymer such as polyimide, aromatic polyamide, polyphenylene, polyxylylene, phenyleneoxide, polysulfone, polyamidoimide, polyesterimide, polybenzimidazole, polyquinazolinedione or polybenzoxazinone.

The present invention is further illustrated by the following nonlimitative examples.

EXAMPLE 1

A separable flask equipped with thermometer, mechanical stirrer, reflux condenser and nitrogen-introducing tube was charged with 6.89 g (21.52 mmol, 97 mol %) of 2,2'-bis(trifluoromethyl)-4,4'-benzidine, 0.16 g (0.66 mmol, 3 mol %) of 1,3-bis(3-aminopropyl)tetramethyldisiloxane, 4.84 g (22.19 mmol) of pyromellitic acid dianhydride and 1.78 g (15 wt % of the amount of solid portion of polyamic acid) of 2,2'-bis(4-(4-maleimide-2-trifluoromethylphenoxy)phenyl)hexafluoropropane. Then, 77.5 g of γ-butyrolactone was added to the mixture, and then the solution was stirred at ambient temperature for 24 hr in a nitrogen gas stream so as to obtain a polyimide precursor composition solution having a viscosity of 490 poise at 22° C. and 15 wt % of solid portion concentration.

The following tests were made to evaluate the polyimide composition obtained from the polyimide precursor composition.

1. Adhesion Strength Test

The polyimide precursor composition solution was applied to a substrate by spin coating. Then, the solvent was removed by heating the polyimide precursor film at a temperature of 70° C. for 1 hr. Then, the polyimide precursor film was heated at a temperature of 350° C. for 1 hr so as to convert the same into a polyimide composition film having a thickness of about 2 μm. The polyimide film was cut so as to make 100 areas of 1 mm squares in accordance with JIS K-5400. Then, the polyimide film was subjected to pressure cooking at a temperature of 121° C. under a pressure of 2.2 kg/cm². After the lapse of 100 hr, peeling test was conducted with adhesive tape. The result was indicated by the number of no peel areas among 100 areas. In Example 1, aluminum, silicon, alumina, borosilicate glass and polyimide-coated silicon were respectively used as the substrate in the adhesion strength tests. The results of all the tests were 100. That is, none of 100 areas peeled off, which shows a good adhesion strength.

2. Distortion Test

The polyimide precursor composition solution was applied to silicon substrates of 4 inch wafer having a thickness of 525 μm by spin coating. The solvent was removed at a temperature of 70° C for 1 hr. Then, the polyimide precursor films were respectively heated at temperatures of 250° C., 300° C. and 350° C. for 1 hr so as to produce the substrates coated with the polyimide composition films having a thickness of about 30 μm. The amount of distortion and residual stress of the polyimide film-coated substrate were measured with a thin film stress measuring device of Flexus Co. (Model F-2300). When the polyimide film surface becomes concavely curved, the polyimide film is tensioned. Therefore, the value of residual stress becomes positive, and the value of distortion becomes negative. In Example 1, with respect to first, second and third films heated at temperatures of 250°, 300° and 350° C. respectively, the values of distortion were respectively −2 μm, 9 μm and 3 μm and the values of residual stress were respectively 1 MPa, −5 MPa and −2 MPa. When the first and second films were heated again at a temperature of 350° C. for 1 hr, the values of distortion were 1 μm and 5 μm, respectively and the values of residual stress were −0.2 MPa and −2 MPa, respectively. The substrate to which the polyimide precursor composition solution had been applied was heated at 70° C. for 1 hr and at 300° C. for 1 hr. After that treatment, the obtained polyimide film was heated at 350° C. for 1 hr without any interruption of heating. With this, the value of distortion was 2 μm and the value of residual stress was −1 MPa. When the film was heated at about the temperature of maximum exothermic point (305° C.) as the final heating, the value of residual stress became maximum in terms of the absolute value.

3. wet Etching Test

The polyimide precursor composition solution was applied to the silicon substrate by spin coating. Then, the solvent was removed at a temperature of 70° C. for 1 hr. Then, the polyimide precursor film was heated at a temperature of 250° C. for 2 hr so as to produce the polyimide film having a thickness of about 30 μm. Then, the polyimide film was coated with a negative type resist (FSR of Fuji Chemical Industry Co., Ltd.), followed by making the line and space having 50 μm. Then, the film was etched by immersing the same for 5 min in a methanol solution of 40° C. containing tetramethyl-ammonium hydroxide (12 wt %), ethanolamine (20 wt %) and water (3 wt %). The result was shown by the maximum depth when the line and space pattern having no side etch was obtained. In Example 1, the result of wet etching test was at least 30 μm.

EXAMPLES 2–5 and Comparative Examples 1 and 2

In Examples 2–5 and Comparative Examples 1 and 2, the process of preparing the polyimide precursor composition solution of Example 1 was repeated except in that 2,2'-bis(4-(2-trifluoromethyl-4-maleimidephenoxy)phenyl) hexafluoropropane of Example 1 was used in amounts of 5 wt % of the solid portion of the polyamic acid (Example 2), 10 wt % of the same (Example 3), 20 wt % of the same (Example 4), 30 wt % of the same (Example 5), 0 wt % of the same (Comparative Example 1) and 40 wt % of the same (Comparative Example 2) respectively so as to obtain the polyimide precursor composition solution containing 15 wt % of solid portion. In Comparative Example 1, the maleimide compound was omitted.

The same adhesion strength test as that of Example 1 was conducted with respect to the substrates of aluminum, silicon, alumina and polyimide-coated silicon. In Examples 2–5 and Comparative Examples 1 and 2, all the results with respect to the substrates of aluminum and silicon were 100. In Examples 2–5 and Comparative Examples 1 and 2, the results with respect to the substrate of alumina were 40, 95, 100, 100, 0 and 90, respectively. In Examples 2–5 and Comparative Examples 1 and 2, the results with respect to the substrate of polyimide-coated silicon were 30, 80, 100, 100, 0 and 90, respectively.

The same distortion test as that of Example 1 was conducted. In Examples 2–5 and Comparative Examples 1 and 2, the results were 5 μm, 5 μm, 2 μm, −3 μm, 11 μm and −30 μm, respectively.

The same wet etching test as that of Example 1 was conducted. The result of Example 2 was at least 20 μm with some side etch. The results of Examples 3 and 4 were at least 30 μm with no side etch. The result of Example 5 was 30 μm. The result of Comparative Example 1 was less than 15 μm with large side etch. In case of Comparative Example 2, some insoluble residue was found.

COMPARATIVE EXAMPLE 3

The process of preparing the polyimide precursor composition solution of Example 1 was repeated except that 1,3-bis(3-aminopropyl)tetramethyldisiloxane was omitted.

The adhesion strength test of Example 1 was conducted with respect to only the silicon substrate. The result was 5.

The distortion test of Example 1 was conducted with respect to the film heated at a temperature of 350° C. The result was 16 μm.

EXAMPLE 6

The process of preparing the polyimide precursor composition solution was repeated except that 2,2'-bis(4-(4-maleimidephenoxy)phenyl)hexafluoropropane was used in place of 2,2'-bis(4-(4-maleimide-2-trifluoromethylphenoxy)phenyl)hexafluoropropane.

The adhesion strength test of Example 1 was conducted with respect to the substrates of aluminum, silicon, alumina, borosilicate glass and polyimide-coated silicon. All the results were 100.

The distortion test of Example 1 was conducted with respect to the film heated at a temperature of 350° C. The amount of distortion was 4 μm, and residual stress was −2 MPa.

The wet etching test of Example 1 was conducted. The result was at least 30 μm.

EXAMPLE 7

The process of preparing the polyimide precursor composition solution of Example 1 was repeated except that BT resin 2170 (Mitsubishi Gas Chemical Co., Ltd.) was used in place of 2,2'-bis(4-(4-maleimide-2-trifluoromethylphenoxy)phenyl)hexafluoro-propane.

The adhesion strength test of Example 1 was conducted with respect to the substrates of aluminum, silicon, alumina, borosilicate glass and polyimide-coated silicon. All the results were 100.

The distortion test of Example 1 was conducted with respect to the film heated at a temperature of 350° C. The amount of distortion was −3 μm, and residual stress was 2 MPa.

The wet etching test of Example 1 was conducted. The result was at least 25 μm.

EXAMPLE 8

A separable flask equipped with thermometer, mechanical stirrer, reflux condenser and nitrogen-introducing tube was charged with 419.35 g (1.31 mol) of 2,2'-bis(trifluoromethyl)-4,4'-benzidine, 10.06 g (0.04 mol) of 1,3-bis(3-aminopropyl)tetramethyldisiloxane and 644.5 g of γ-butyrolactone. Then, the mixture was stirred at room temperature in a nitrogen gas stream so as to prepare a diamine component solution. Separately, 22.10 g (0.050 mol) of hexafluoroisopropylidenediphthalic acid dianhydride, 97.65 g (0.448 mol) of pyromellitic acid dianhydride, 79.64 g (0.249 mol) of 2,2'-bis (trifluoromethyl)-4,4'-benzidine, 41.85 g of 2,2'-bis(4-( 2-trifluoromethyl-4-maleimidephenoxy)phenyl) hexafluoropropane, 9.18 g (0.10 mol) of ethyl cellosolve and 664 g of γ-butyrolactone. Then, the mixture was stirred for 4 hr at a temperature of 70° C. in a nitrogen gas stream so as to prepare a tetracarboxylic acid oligomer solution.

Each of the diamine component solution and the tetracarboxylic acid oligomer solution was poured into a 100-ml polyethylene bottle using a precision metering pump at a flow rate of 6.0 mmol/min for 150.0 sec under the atmosphere of dry nitrogen gas. Then, the bottle was tightly stoppered and then shaken vigorously so as to obtain the polyimide precursor composition solution having 35 wt % of the solid portion concentration. After the lapse of 24 hr without shaking, this solution had a viscosity of 1700 poise at 22° C. Similarly, the above-mentioned process was repeated three times so as to prepare the polyimide precursor composition solutions in another three bottles. All the solutions had a viscosity of 1700 poise at 22° C. and 35 wt % of the solid portion concentration.

The adhesion strength test of Example 1 was conducted with respect to the substrates of aluminum, silicon, alumina, borosilicate glass and polyimide-coated silicon. The results of the all samples were 100.

The distortion test of Example 1 was conducted. In the test, the polyimide precursor solution was applied to the silicon substrates and the aluminum substrates having a diameter of 4 inches and a thickness of 1 mm by spin coating. Then, the films were heated at a temperature of 350° C. for 1 hr so as to produce the silicon and aluminum substrates having thereon the polyimide films having a thickness of about 30 μm. The amounts of distortion of the film-coated silicon and aluminum substrates were −27 μm and 3 μm, respectively. Residual stress of the film-coated silicon and aluminum substrates were 14 MPa and −3 MPa, respectively.

The wet etching test of Example 1 was conducted. The result was at least 30 μm.

COMPARATIVE EXAMPLE 4

The process of preparing the polyimide precursor solution of Example 8 was repeated except that 2,2'-bis(4-( 2-trifluoromethyl-4-maleimidephenoxy)phenyl) hexafluoropropane and ethyl cellosolve were omitted. With this process, the polyimide precursor solution having 15 wt % of solid portion was obtained.

The adhesion strength test of Example 1 was conducted with respect to the substrates of aluminum, silicon, alumina and polyimide-coated silicon. The results with respect to the aluminum and silicon substrates were 100. However, the results with respect to the alumina and polyimide-coated silicon were 0.

The distortion test of Example 1 was conducted. The amount of distortion was −0.2 μm, and residual stress was 0.1 MPa.

As is shown in the following, first and second wet etching tests were conducted.

In the first wet etching test which is in accordance with that of Example 1, the polyimide film was coated with a negative type resist, followed by making the line and space having 50 μm. Then, the film was etched in accordance with the etching process of Example 1. With this, a pattern having a depth of 12 μm was obtained. However, side etch was found. In the second wet etching test, the wet etching test of Example 1 was repeated except that a solution containing hydrazine and ethylenediamine (50:50) was used in place of the etching solution of Example 1. With this, a pattern having a depth of 6 μm was obtained. However side etch was found.

REFERENTIAL EXAMPLE 1

The polyimide precursor solution having 13 wt % of solid portion was prepared by reacting equal molar amounts of a diamine component containing 5.24 g (97 mol % of the diamine component) of 1,4-phenylenediamine and 0.37 g (3 mol % of the diamine component) of 1,3-bis(3-aminopropyl) tetramethyldisiloxane with a tetracarboxylic acid component containing 4.36 g (40 mol % of the tetracarboxytic acid component) of pyromellitic acid dianhydride and 8.83 g (60 mol % of the tetracarboxylic acid component) of biphenyltetracarboxylic acid dianhydride in 126 g of N-methylpyrrolidone.

The adhesion strength test of Example 1 was conducted with respect to substrates of aluminum, silicon, alumina and polyimide-coated silicon. Good adhesion was shown with respect to the aluminum and silicon substrates. However, the results with respect to the alumina and polyimide-coated silicon were 0.

The distortion test of Example 1 was conducted with respect to the film heated at a temperature of 350° C. The amount of distortion was −4 μm, and residual stress was 3 MPa.

The wet etching test of Example 1 was conducted. The result was at most 2 μm.

REFERENTIAL EXAMPLE 2

A diamine component containing 11.16 g (97 mol % of the diamine component) of 4,4'-diaminodiphenyl ether and 0.37 g (3 mol % of the diamine component) of 1,3-bis(3-aminopropyl)tetramethyldisiloxane was reacted with a tetracarboxylic acid component containing 7.63 g (70 mol % of the tetracarboxylic acid) of pyromellitic acid dianhydride and 4.83 g (30 mol % of the tetracarboxylic acid) of benzophenonetetracarboxylic acid dianhydride in 160 g of N-methylpyrrolidone so as to produce a viscous polyamic acid solution having 13 wt % of solid portion.

Separately, the above-mentioned diamine component was reacted with the above-mentioned tetracarboxylic acid component in 160 g of γ-butyrolactone. With this, at first, a uniform solution was obtained. Then, this solution was turned into a slurry containing a white solid. Then, this solid dissolved gradually, and thus the slurry was turned into a viscous solution.

The above-mentioned polyamic acid solution was used for the following adhesion strength test, distortion test and wet etching test.

The adhesion strength test of Example 1 was conducted with respect to substrates of aluminum, silicon, borosilicate glass, alumina and polyimide-coated silicon. The results showed good adhesion with respect to all the substrates.

The distortion test of Example 1 was conducted with respect to the film heated at a temperature of 350° C. The amount of distortion was −93 μm, and residual stress was 48 MPa.

The wet etching test of Example 1 was conducted. The result was at most 3 μm.

REFERENTIAL EXAMPLE 3

8.01 g of 2,2'-bis(trifluoromethyl)-4,4'-benzidine and 5.46 g of pyromellitic acid dianhydride were added to N-methylpyrrolidone so as to prepare 90 g of N-methylpyrrolidone solution of polyamic acid, which contains 13 wt % of solid portion. Then, 2.0 g of 2,2'-bis(4-( 2-trifluoromethyl-4-maleimidephenoxy)phenyl)hexafluoropropane amounting to 15 wt % of the solid portion was added to the N-methylpyrrolidone solution, and then the mixture was stirred. This mixture was a viscous solution upon preparation. However, it gelled after the lapse of 24 hr.

Separately, 4.0 g of 2,2'-bis(trifluoromethyl)-4,4'-benzidine, 5.45 g of pyromellitic acid dianhydride and 2.0 g of 2,2'-bis(4-(2-trifluoromethyl-4-maleimidephenoxy)phenyl)hexafluoropropane were added to N-methylpyrrolidone to prepare a N-methylpyrrolidone solution of oligomer solution. This solution did not gel even after the lapse of one week.

Still separately, 3.0 g of 2,2'-bis(trifluoromethyl)- 4,4'-benzidine and 8.0 g of 2,2'-bis(4-(2-trifluoromethyl- 4-maleimidephenoxy)phenyl)hexafluoropropane were dissolved in 30 g of N-methylpyrrolidone. The mixture gelled after the lapse of 24 hr.

Still separately, 3.0 g of 2,2'-bis(trifluoromethyl)- 4,4'-benzidine and 8.0 g of 2,2'-bis(4-(2-trifluoromethyl- 4-maleimidephenoxy)phenyl)hexafluoropropane were dissolved in 30 g of γ-butyrolactone. The mixture did not gel even after the lapse of one week.

What is claimed is:

1. A polyimide precursor composition solution comprising:

a tetracarboxylic acid component containing not less than 70 mol % of at least one member selected from the group consisting of benzenetetracarboxylic acid, its anhydrides and esters a bismaleimide compound; and a diamine component containing not less than 70 mol % of 2,2'-substituted-4,4'-benzidine represented by the general formula (I) and siloxy diamine amounting to from 1 to 10 mol %,

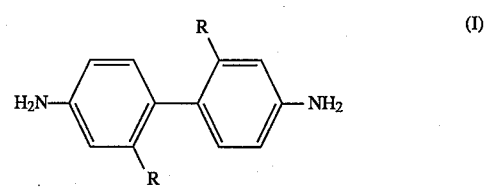

wherein R are the same or different ones selected from the group consisting of $CF_3$, $CH_3$, $C_2H_5$, $OCH_3$, $OC_2H_5$, Cl, Br and phenyl group, wherein said tetracarboxylic acid component, said bismaleimide compound and said diamine component are dissolved in a solvent which is consisting essentially of γ-butyrolactone, wherein the amount of said tetracarboxylic acid component is substantially equivalent to that of said diamine component, and wherein the amount of said bismaleimide compound is from 5 to 30 wt % of the total weight of said tetracarboxylic acid and said diamine component.

2. A solution according to claim 1, wherein said tetracarboxylic acid component is one selected from the group consisting of pyromellitic acid and pyromellitic acid dianhydride.

3. A solution according to claim 1, wherein said 2,2'-substituted-4,4'-benzidine is 2,2'-bis(trifluoromethyl)-4,4'-benzidine.

4. A solution according to claim 1, wherein said bismaleimide compound is a bismaleimide diphenyl ether.

5. A solution according to claim 1, wherein said maleimide compound is one selected from the group consisting of 2,2-bis[4-(2-trifluoromethyl-4-maleimidephenoxy)phenyl]hexafluoropropane and 2,2-bis[4-(4maleimidephenoxy)phenyl]hexafluoropropane.

6. A low stress polyimide composition which is prepared by applying a solution according to claim 1 to a substrate, then by heating the applied solution at a first temperature to remove a solvent and to form a precursor film, and then by heating the precursor film at a temperature not lower than 200° C. to cure the same.

7. A composition according to claim 6, wherein the second temperature ranges from 200° to 400° C.

8. A composition according to claim 6, wherein the first temperature ranges from 50° to 150° C.

* * * * *

UNITED STATES PATENT AND TRADEMARK OFFICE
CERTIFICATE OF CORRECTION

PATENT NO. : 5,478,918

DATED : December 26, 1995

INVENTOR(S) : Masamichi MARUTA et al.

It is certified that error appears in the above-identified patent and that said Letters Patent is hereby corrected as shown below:

On the title page --   should read:

(30) Foreign Application Priority Data

February 9, 1993 (JP) Japan ................ 5-20970

Signed and Sealed this

Thirteenth Day of August, 1996

Attest:

BRUCE LEHMAN

*Attesting Officer*    *Commissioner of Patents and Trademarks*